United States Patent
Kato et al.

(10) Patent No.: US 6,240,245 B1
(45) Date of Patent: *May 29, 2001

(54) RECORDING/REPRODUCING DEVICE FOR VARIOUS FORMATS

(75) Inventors: Naoki Kato; Shigehisa Aoki, both of Tokyo (JP)

(73) Assignee: Mitsubishi Denki Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/919,219

(22) Filed: Aug. 28, 1997

(30) Foreign Application Priority Data

Sep. 2, 1996 (JP) .................................................. 8-232284

(51) Int. Cl.[7] .............................................. H04N 5/91
(52) U.S. Cl. ........................ 386/131; 348/554; 348/555; 348/441
(58) Field of Search ................................. 386/1, 46, 108, 386/131, 123–124; 348/448, 441, 552, 558, 554–556; 360/32; 345/154; H04N 5/91

(56) References Cited

U.S. PATENT DOCUMENTS

| | | | |
|---|---|---|---|
| 4,689,022 | * | 8/1987 | Peers et al. .......................... 434/307 |
| 4,994,912 | * | 2/1991 | Lumelsky et al. .................... 358/140 |
| 5,119,074 | * | 6/1992 | Greaves et al. ...................... 340/701 |
| 5,249,164 | * | 9/1993 | Koz ....................................... 358/21 |
| 5,280,397 | * | 1/1994 | Rhodes ................................. 360/36.2 |
| 5,317,413 | * | 5/1994 | Yanagihara et al. ................. 386/131 |
| 5,341,178 | * | 8/1994 | Ebihara et al. ...................... 348/705 |
| 5,450,140 | * | 9/1995 | Washino ............................... 348/772 |
| 5,485,280 | * | 1/1996 | Fujinami et al. .................... 386/131 |
| 5,502,503 | * | 3/1996 | Koz ...................................... 348/552 |
| 5,523,789 | * | 6/1996 | Oguchi et al. ....................... 348/448 |
| 5,555,097 | * | 9/1996 | Joung et al. ......................... 358/335 |
| 5,611,038 | * | 3/1997 | Shaw et al. .......................... 395/806 |
| 5,649,048 | * | 7/1997 | Tomita et al. ....................... 386/131 |
| 5,675,390 | * | 10/1997 | Schindler et al. ................... 348/552 |

FOREIGN PATENT DOCUMENTS 0575971  3/1993 (JP) .
0795614  4/1995 (JP) .

* cited by examiner

Primary Examiner—Wendy R. Garber
Assistant Examiner—Vincent F. Boccio

(57) ABSTRACT

A recording/reproducing device including a recording/reproducing unit for recording/reproducing TV signals, and input device for inputting second signals of a system other than the TV signal system and a converter capable of converting the second signals into the same as signals at the TV signal recording time, wherein the second signals is capable of being recorded by the converter.

7 Claims, 14 Drawing Sheets

RECORDING/REPRODUCING DEVICE FOR VARIOUS FORMATS

BACKGROUND OF THE INVENTION

The present invention relates to a recording/reproducing device for recording/reproducing television signals (as will be called the "TV signals") or the like and, more particularly, to a recording/reproducing device which is able to convert TV signals and second signals mutually by combining a converting function using digital signal processing.

There is a converter unit capable of converting signals of different formats/resolutions of personal computers, workstations or VTRs.

FIG. 12 is a block diagram showing a recording/reproducing device having a conventional converter unit connected therewith.

In FIG. 12: reference numeral 1 designates a conventional VTR; numeral 2 a video cassette tape for recording video signals; numeral 10 a device such as a computer having RGB outputs; numeral 11 a distributor for outputting RGB signals, as inputted from the device 10, to a plurality of units including a converter and a change-over unit; numeral 12 a down-convert unit for converting inputted RGB signals into video signals and outputting the video signals or for outputting inputted video signals as they are; numeral 13 a video input terminal in the VTR for inputting video signals from another device; numeral 14 an antenna for receiving TV waves; numeral 15 and antenna input terminal for inputting signals from the antenna 14; numeral 3 a tuner for converting signals, as inputted from the antenna input terminal 15, into video signals; numeral 4 a change-over switch for selecting one of the video signals coming from the video input terminal 13 and the tuner 3, to send it to a downstream block; numeral 5 a recording block for recording video signals; numeral 6 a magnetic recording/reproducing block acting as a deck portion and a circuit for recording signals, as converted by the recording block 5, on the video tape 2; numeral 7 a reproducing block for converting the signals on the video tape 2, as fetched by the magnetic recording/reproducing block 6, into video signals; numeral 8 a control block for controlling the system entirety of the VTR 1 by a switch or a remote control; numeral 16 an antenna output terminal for outputting RF signals, as outputted from the reproducing block, to the outside of the VTR 1; numeral 17 a video output terminal for outputting video signals, as outputted from the reproducing block 11, to the outside of the VTR 1; numeral 18 an up-convert unit for converting inputted video signals into RGB signals to output them or for outputting the inputted video signals as they are; numeral 19 a switcher for selecting one of a plurality of RGB input signals, as inputted from the distributor 11 or the up-convert unit 18, to output it; numeral 20 a display monitor for displaying inputted RGB signals as an image; and numeral 21 a device such as a TV set for displaying inputted video signals as an image.

When the VTR 1 is put into an ordinary use in the system construction described above, the down-convert unit 12 makes a selection to output the inputted video signals as they are. When the signals of the personal computer 10 or the like are to be displayed on the display monitor 20 or the like, the switcher 19 makes a selection to output the input signals from the distributor 11.

When the reproduced signals of the antenna input terminal 15, the video input terminal 13 and the video tape 2 are to be displayed on the display monitor 20 or the like for displaying the RGB signals as an image, on the other hand, the switcher 19 makes a selection to output the input signal from the up-convert unit 18. When the RGB signals, as outputted from the personal computer 10 or the like, are to be displayed on the TV set 21 or the like, on the other hand, the down-convert unit 12 makes a selection to convert the RGB signals into the video signals and to output them.

Here, the recording/reproducing device having the aforementioned converter unit connected therewith can be used in the following device.

FIG. 13 is a diagram showing a construction to be used in the video CD player, VD player, LD player or DVD player of the prior art.

In FIG. 13: reference numeral 31 designates a reproducing disk; numeral 32 a disk player such as a DVD player for reproducing the reproducing disk 31; numeral 33 a video output terminal; and numeral 34 a home TV set connected with the video output terminal. Moreover, the disk player 32 is composed of a reproducing block 35 for reproductively processing the signals recorded in the reproducing disk 31, and a video conversion processing circuit 36 for converting the reproduced signals into video signals.

In the construction described above, the signals, as obtained from the reproducing disk 31, are processed by the reproducing block and the video conversion so that they are outputted as the video signals from the video output terminal 33 thereby to display the recorded image in the home TV set 34 or the like.

In recent years, on the other hand, there have been used an increasing number of disk reproducing device which has a portion of the function of a disk ROM connected with a computer for the data transfer.

FIG. 14 is a diagram showing a construction to be used in a personal computer video CD player of the prior art.

In FIG. 14: reference numeral 41 designates a reproducing disk; numeral 42 a disk unit; numeral 43 a reproducing block for reproducing signals recorded in the reproducing disk 41; numeral 44 a data bus interface (I/F) for connecting the disk unit 42 with the personal computer; numeral 45 the personal computer; numeral 46 a data bus interface (I/F) for connecting the personal computer 45 with the disk unit 42; numeral 47 a CPU; numeral 48 a data bus for connecting the CPU 47 and each circuit; numeral 49 a PC data conversion processing circuit for converting input signals to be inputted to the personal computer 45, into digital data signals for the personal computer; numeral 50 a video conversion processing unit for converting data into video signals; numeral 51 a D/A converter for converting digital video signals into analog video signals; numeral 52 a video output terminal for outputting video signals; and numeral 53 a display monitor connected with the video output terminal 52.

In this construction, the signals, as obtained from the reproducing disk 41, are processed by the producing block, and the digital data for the data bus are then converted and inputted to the inside of the personal computer 45 through the data bus I/F 44 and 46. The inputted video signals are converted by the PC data conversion processing circuit 49 into data bus digital data, which are inputted to another video conversion processing unit 50 via the data bus 48 connected with the CPU 47, so that they are converted into video signals. The video signals thus converted are subjected to a D/A conversion by the D/A converter 51 so that they are outputted as the RGB (i.e., analog video signals in red, green and blue colors) outputs from the RGB output terminal 52 thereby to display the image or the like, as recorded in the reproducing disk 41, in the computer display monitor 53.

In this recording/reproducing device of the prior art, however, the recording/reproduction of the second signals (i.e., signals of a system other than the TV signal system) in the VTR (i.e., the recording/reproducing device), as shown in FIG. 12, could be realized by connecting the up-convert unit 18 (i.e., a converter U) 18 for converting the TV signals into the second signals and the down-convert unit (i.e., a converter D) for converting the second signals into the TV signals. However, the switching operations at the input selecting time are complicated, as described above. Another problem is that two sets of convert units having similar constructions have to be incorporated.

In the disk devices shown in FIGS. 13 and 14, on the other hand, in accordance with the large capacity of the disk media of recent years, from the manner to reproduce the video information recorded in the disk 31, as shown in FIG. 13, to display it in the home TV set 34, there is increasing the method of using the disk device which has two aspects of the reproducing device and the video reproducing device for reproducing data to be used in the computer, as shown in FIG. 13. When the disk device is merely used as the video reproducing device, the system shown in FIG. 14 us used as the data reproducing device, too, so that the inputted data never fail to be subjected to a video conversion before they are fed to the data bus, and are outputted as the RGB outputs to the display monitor. This raises a problem that the CPU is burdened.

SUMMARY OF THE INVENTION

The present invention has been conceived to solve the aforementioned two problems, and has a first object to provide a recording/reproducing device which can display the TV signals or the reproduced video signals of the recorder such as the VTR on a monitor or the like corresponding to the second signal system and can display the video signals of the second signal system on a home TV set by converting the scanning lines, and which can realize, with fewer parts, a recording having a built-in scanning line conversion unit for recording the video signals of the second signal system by the signal processing of an ordinary recorder.

A second object of the present invention is to provide a recording/reproducing device which is enabled to reduce the burden on the CPU by causing the display monitor to act for displaying the screen of the computer and for displaying the reproduced image of the player.

According to the present invention, there is provided a recording/reproducing device comprising: recording/reproducing means for recording/reproducing TV signals; input means for inputting second signals of a system other than the TV signal system; and first conversion means capable of converting the second signals into the same signals as those at the TV signal recording time, wherein the second signals can be recorded by the conversion means.

A recording/reproducing device according to the present invention comprises: recording/reproducing means for recording/reproducing TV signals; input/output means for inputting/outputting the TV signals and the second signals; and second conversion means capable of the TV signals into the second signals, wherein the recorded signals can be converted into the second signals and outputted.

A recording/reproducing device according to the present invention comprises both the first conversion means and the second conversion means, wherein while one of the conversion by the first conversion means and the second conversion means is active, the other conversion is inhibited.

A recording/reproducing device according the present invention further comprises: switch means capable of outputting the second signals, before converted by the first conversion means, as they are to a display for outputting the second signals when the first conversion means is active.

In a recording/reproducing device according to the present invention, the conversion means includes one converter capable of switching, in response to a predetermined control signal, the first conversion to convert the second signals into the same signals as those at the TV signal recording time and the second conversion to convert the TV signals into the second signals.

In a recording/reproducing device according to the present invention, the converter includes: an input unit for video signals; an A/D converter for converting the video signals into predetermined digital signals; a buffer memory for storing digital data temporarily; a D/A converter for converting digital video signals into analog video signals; an output unit for video signals; and a timing generator for generating timing signals to control the above-specified inclusive.

In a recording/reproducing device according to the present invention, the horizontal synchronizing signal period of VGA (Video Graphic Array) signals, as inputted to the converter, is doubled for the conversions from the horizontal synchronizing signal period of NTSC signals.

A recording/reproducing device according to the present invention further comprises: a disk unit capable of reproducing a disk, wherein the disk unit includes: the conversion means; and signal switching means for switching the outputs of the video signals connected with the conversion means and predetermined RGB signals.

DETAILED DESCRIPTION OF THE PREFERRED EMBODIMENTS

The present invention will be specifically described with reference to the accompanying drawings.

Embodiment 1

Figure 1:
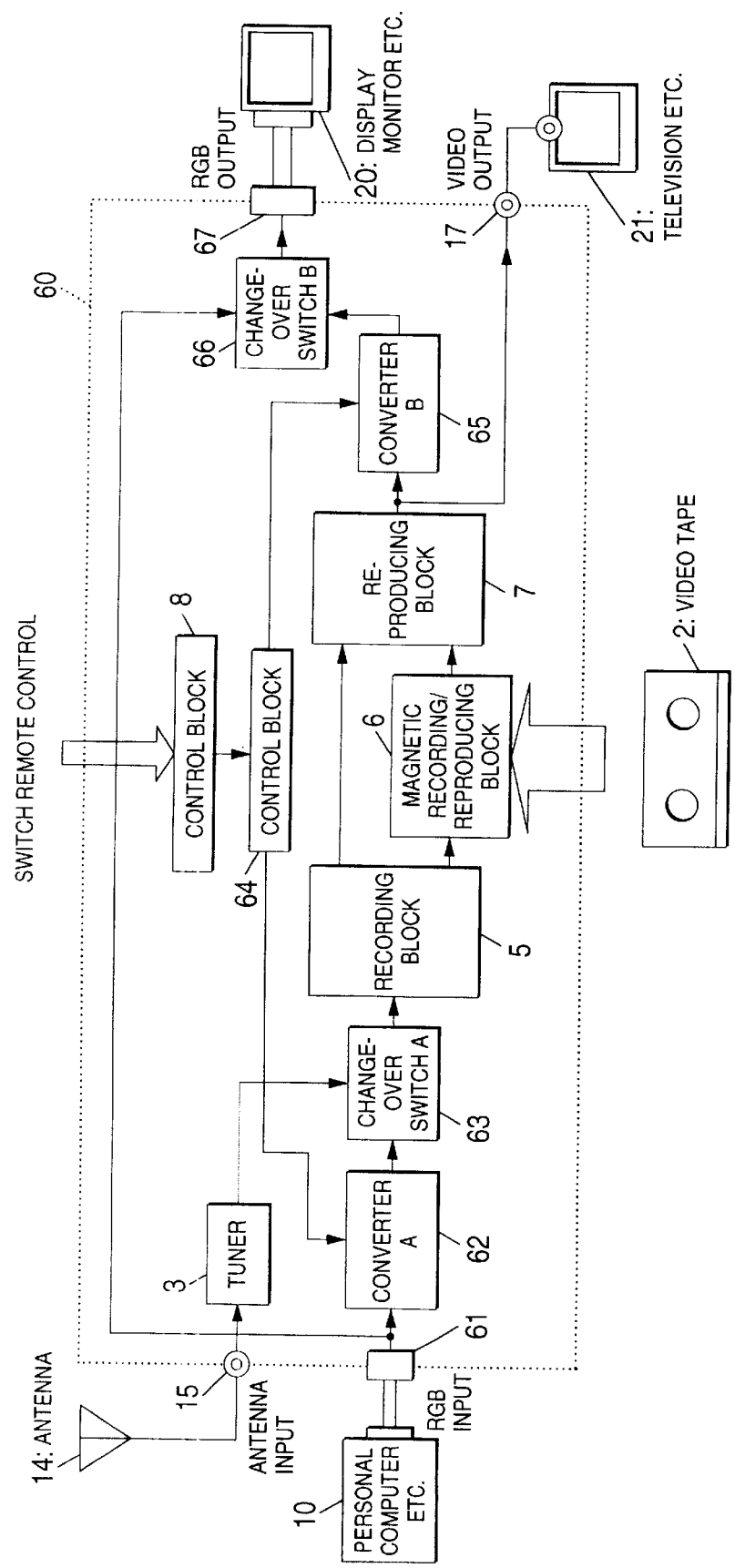
FIG. 1 is a block diagram showing a construction of a recording/reproducing device according to Embodiment 1 of the present invention.
Figure 12:
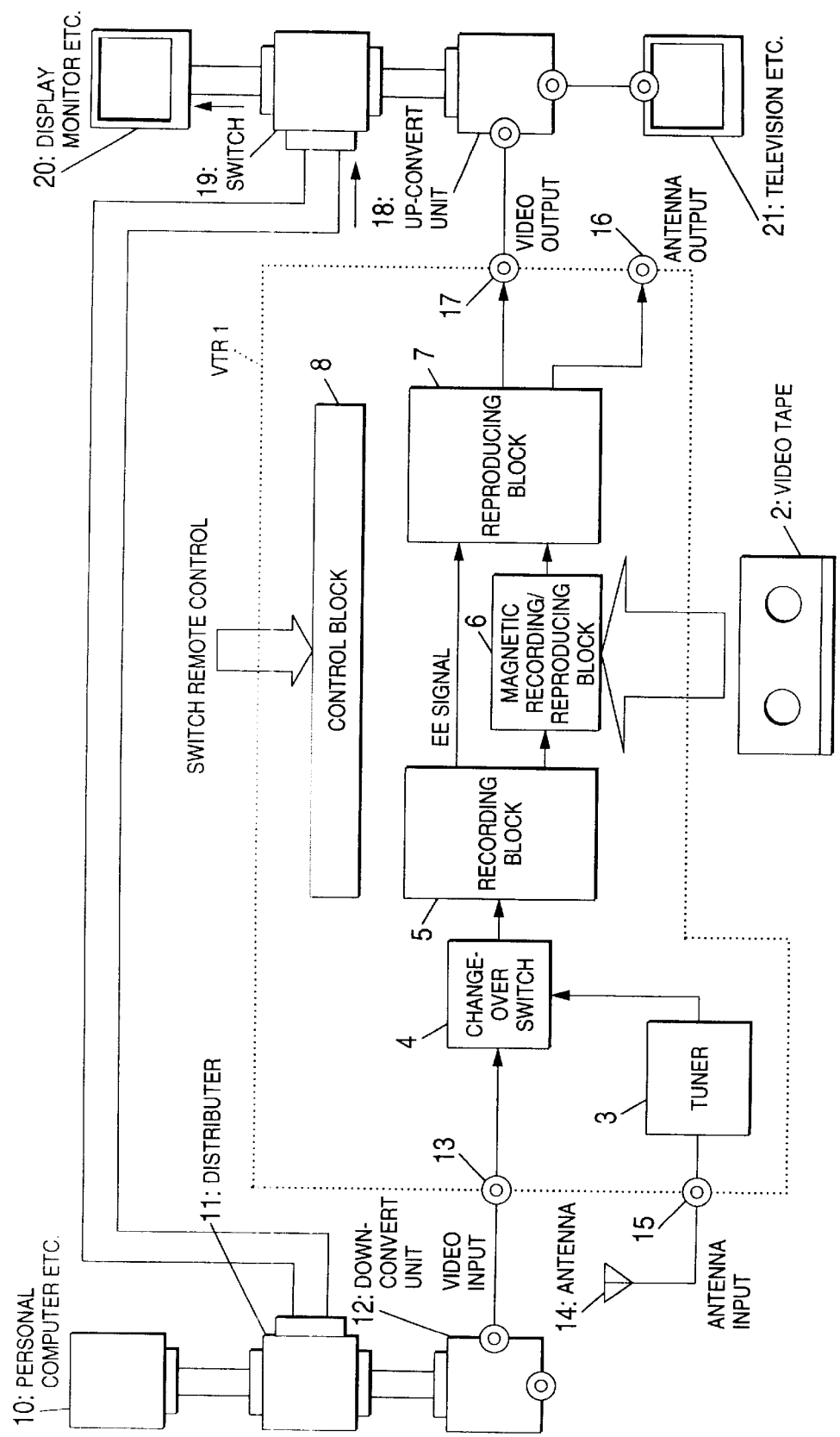
FIG. 12 is a block diagram showing a construction of the recording/reproducing device of the prior art.

FIG. 1 is a block diagram showing a construction of a recording/reproducing device according to Embodiment 1 of the present invention. Upon description of the recording/reproducing device of Embodiment 1, the same components as those of the recording/reproducing device shown in FIG. 12 are designated by the same reference numerals.

In FIG. 1: reference numeral 60 designates a recording/reproducing device (VTR); numeral 2 a video cassette tape for recording video signals; numeral 10 a device such as a computer having RGB outputs; numeral 14 an antenna for receiving TV waves; numeral 15 an antenna input terminal for inputting signals form the antenna 14; numeral 61 an RGB input terminal (or input or input/output) for inputting RGB signals from the personal computer 10 or the like; numeral 3 a tuner for converting signals, as inputted from the antenna input terminal 15, into video signals; numeral 62 a converter A for converting the RGB signals, as inputted from the RGB input terminal 61, into video signals; numeral 63 a change-over switch A for selecting and outputting one of input signals coming from the tuner 6 and the converter A62; numeral 5 a recording block for recording video signals; numeral 6 a magnetic recording/reproducing block for recording signals, as converted by the recording block 5, on the video tape 2; numeral 7 a reproducing block for converting the signals on the video tape 2, as fetched by the magnetic recording/reproducing block 6, into video signals; numeral 8 a control block for controlling the system entirety of the VTR 60; numeral 64 a control block for performing a control to give a command for switching the up-convert function/the down-convert function of the converters A62 and B64 in response to the command of the control block 8; numeral 65 a converter B for converting the video signals, as outputted from the reproducing block 7, into the RGB signals; numeral 66 a change-over switch B for selecting and outputting one of the input signals coming from the converter B65 and the RGB input terminal 61; numeral 17 a terminal for outputting RF signals, as outputted from the reproducing block 11, to the outside of the VTR 60; numeral 67 an RGB output terminal for outputting the RGB signals, as selected by the change-over switch B66, to the outside of the VTR 60; numeral 17 a video output terminal for outputting the video signals from the reproducing block 11 to the outside; numeral 20 a display monitor for displaying inputted RGB signals as an image; and numeral 21 a device such as a TV set for displaying inputted video signals as an image.

The recording block 5, magnetic recording/reproducing block 6 and reproducing block 7 described above construct as a whole recording/reproducing units for recording/reproducing the TV signals.

The aforementioned converter A62 is a converter having a down-convert function, and the aforementioned converter B65 is a converter having a up-convert function. These converters are separately shown in FIG. 1 so as to illustrate the two functions but are given a hardware construction of one up/down converter 80, as shown in FIG. 3.

Figure 2:
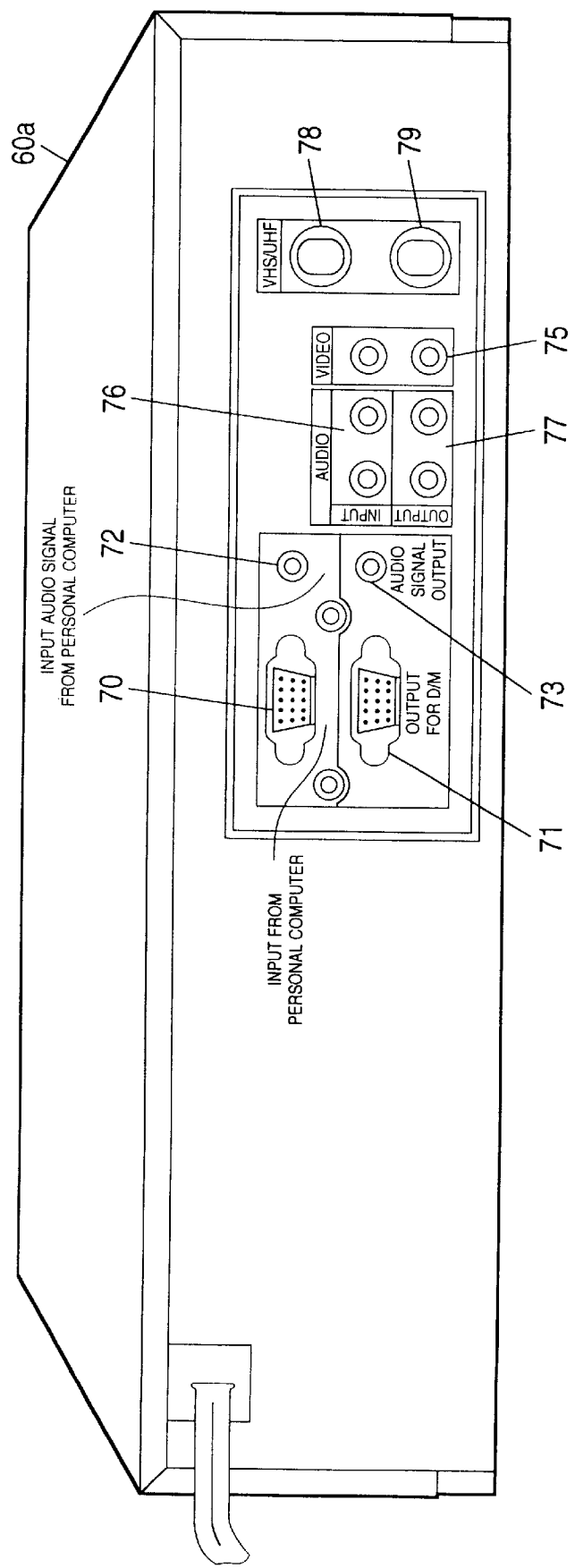
FIG. 2 is an external view showing a the connection terminals of the recording/reproducing device according to Embodiment 1 of the present invention.

FIG. 2 is an external view showing the connection terminals of the aforementioned converter built-in recording/reproducing device (VTR) 60.

In FIG. 2: reference numeral 60a designates a converter built-in VTR body; numeral 70 a VGA input terminal for inputting RGB signals from the computer or the like; numeral 71 a monitor output terminal for outputting the RGB signals to a device having an RGB input; numeral 72 a terminal for inputting an audio signal from a device or the like connected with the VGA input terminal 70; numeral 73 a terminal for outputting the selected audio signal in synchronism with the monitor output terminal 71; numeral 74 a video signal input terminal for inputting the video signals to the converter built-in VTR body 60a; numeral 75 a video signal output terminal for outputting the video signals from the VTR body 60a; numeral 76 a audio signal input terminal for inputting audio signals to the VTR body 60a; numeral 77 an audio signal output terminal for outputting the audio signals from the VTR body 60a; numeral 78 an RF signal input terminals for inputting the RF signals from the antenna; and numeral 79 an RF signal output terminal for outputting the RF signals.

Figure 3:
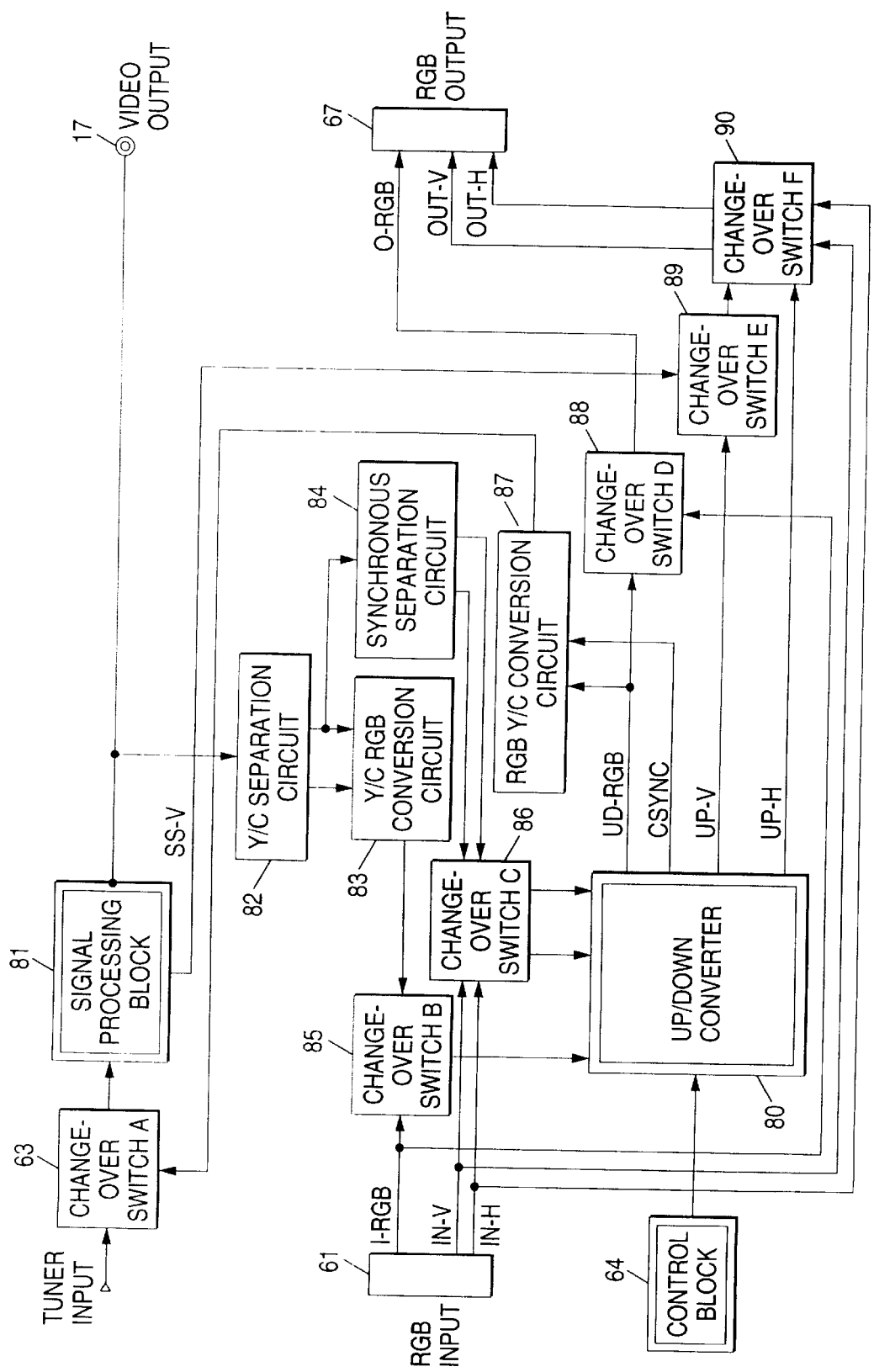
FIG. 3 is a block diagram showing a construction for switching the functions of a converter A and a converter B by one converter unit of the recording/reproducing device according to Embodiment 1 of the present invention.

FIG. 3 is a block diagram showing a construction for switching the functions of the converter A62 and the converter B65 by one converter unit.

In FIG. 3, reference numeral 80 designates the up/down converter having the down-convert function and the up-convert function. This up/down converter 80 is one converter unit having the function of the converter A62 ad the converter B65, as shown in FIG. 1.

In FIG. 3: reference numeral 61 designates an RGB input terminal for inputting RGB signals from the personal computer or the like; numeral 63 a change-over switch A for selecting and outputting one of input signals from a turner input and an (later-described) RGB-Y/C conversion circuit 87; numeral 81 a signal processing block for processing video signals; numeral 82 a Y/C separation circuit for separating luminance signals (Y) and color signals (C) from the video signals; numeral 83 a Y/C-RGB conversion circuit for converting the luminance signals and the color signals into the RGB signals; numeral 84 a synchronous separation circuit for separating vertical and horizontal synchronizing signals from the luminance signals; numeral 85 a change-over switch B for selecting and outputting one of the input of the RGB input terminal 61 and the RGB signals of the Y/C-RGB conversion circuit 83; numeral 86 a change-over switch C for selecting and outputting one of the input of the RGB input terminal 61 and the vertical and horizontal synchronizing signals of the synchronous separation circuit 84; numeral 80 the aforementioned up/down converter having the functions to convert the signals inputted from the change-over switch B85 and the change-over switch C86; numeral 64 a control block for controlling the up/down converter 80 and the individual change-over switches; numeral 87 an RGB-Y/C conversion circuit for converting the RGB signals and the composite synchronizing signals; numeral 88 a change-over switch D for selecting and outputting one of the RGB signals coming from the up/down converter 80 and the RGB input terminal 61; numeral 89 a change-over switch E for selecting and outputting one of the vertical synchronizing signals, as outputted from the up/down converter 80 and the signal processing block 81; numeral 90 a change-over switch F for selecting and outputting one of the horizontal synchronizing signals coming from the up/down converter 80 and the RGB input terminal 61; numeral 67 an RGB output terminal for outputting the RGB, as selected y the change-over switch D88, to the outside of the VTR; and numeral 17 a video output terminal for outputting the video signals from the signal processing block 81 to the outside.

Figure 4:
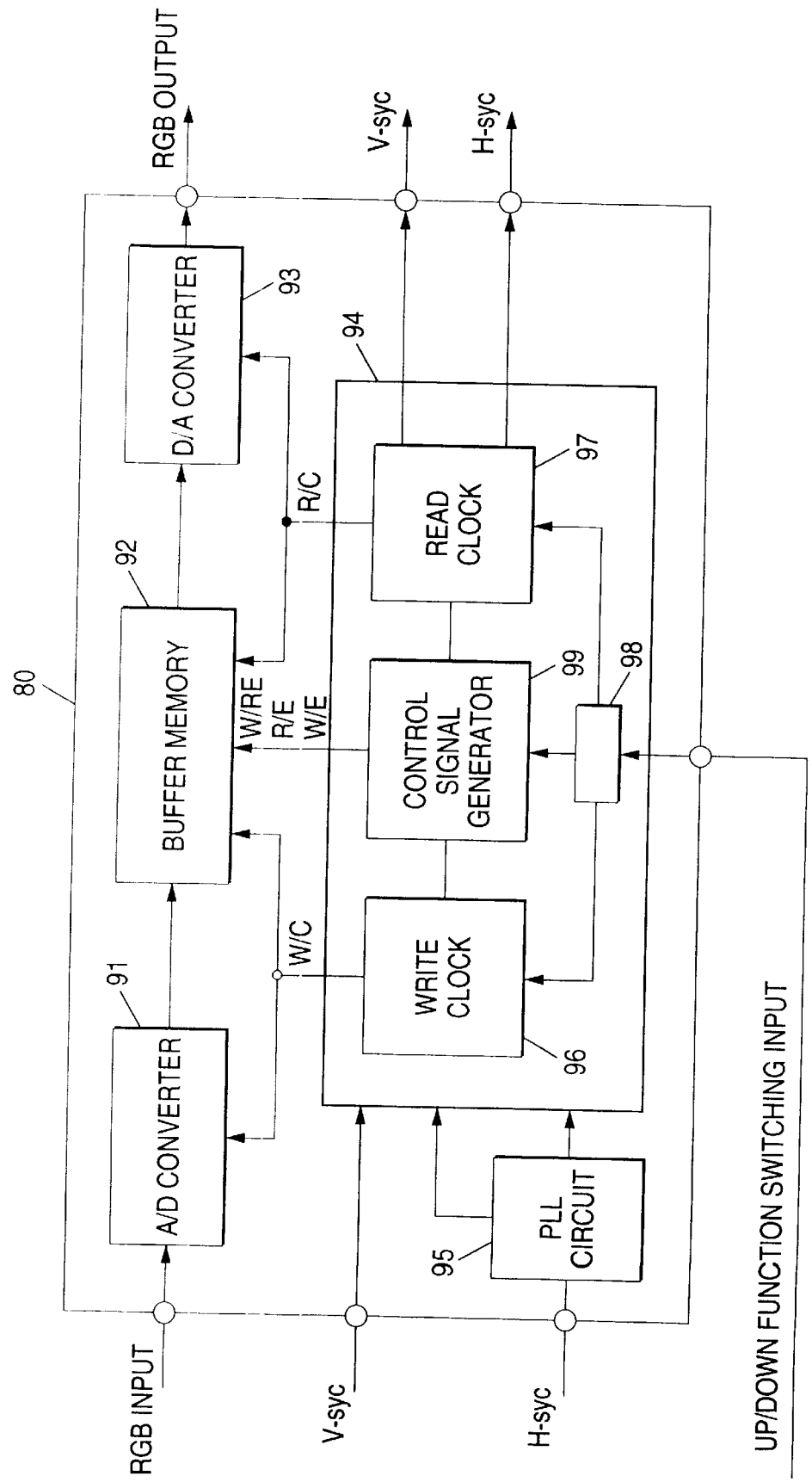
FIG. 4 is a block diagram showing the construction of an up/down converter of the recording/reproducing device according to Embodiment 1 of the present invention.

FIG. 4 is a block diagram showing a construction of the aforementioned up/down converter 26.

In FIG. 4, reference numeral 91 designates an A/D converter for converting inputted analog video signals (RGB) into digital video signal data, and numeral 92 designates a buffer memory for storing the digital data, e.g., video data of one horizontal line of the image temporarily. Numeral 93 designates a D/A converter for converting the digital video signals into the analog video signals; numeral 94 a timing generator for controlling the operation timings of the aforementioned A/D converter 91, buffer memory 92 and D/A converter 93; and numeral 95 a PLL (Phase Locked Loop) circuit for generating clocks, as synchronized with the inputted horizontal synchronizing signals, of the timing generator 94.

In this timing generator 94, moreover: numeral 96 designates means for generating write clocks; numeral 97 means for generating read clocks; numeral 98 a control mode discriminator for discriminating the operation mode in accordance with the up/down function switching input control signals for switching the operations; and numeral 99 a control signal generator for generating the individual write/read timings in accordance with the information of the control mode discriminator 98.

Figure 5:
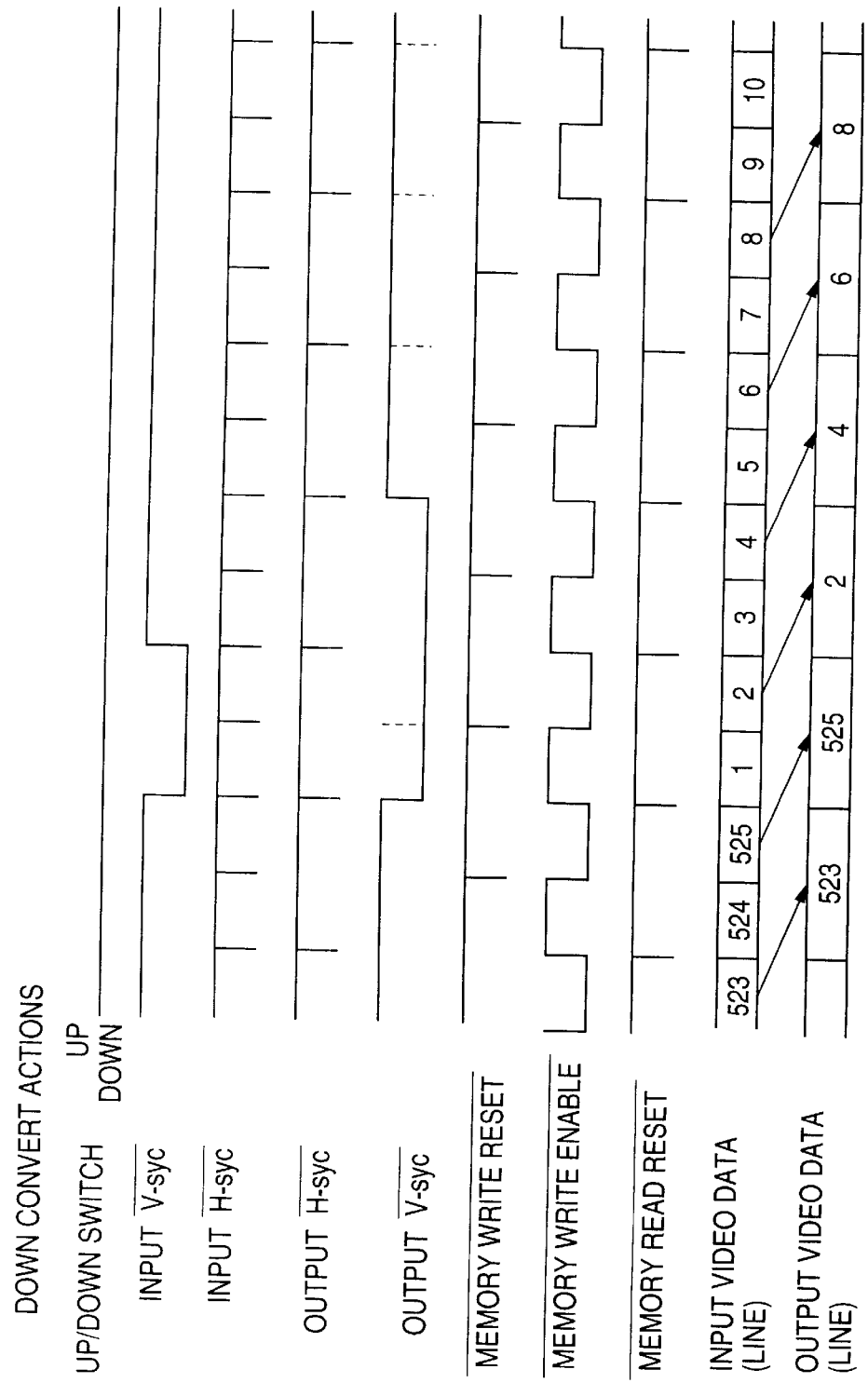
FIG. 5 is a timing chart illustrating the down actions of the up/down converter of the recording/reproducing device according to Embodiment 1 of the present invention.
Figure 6:
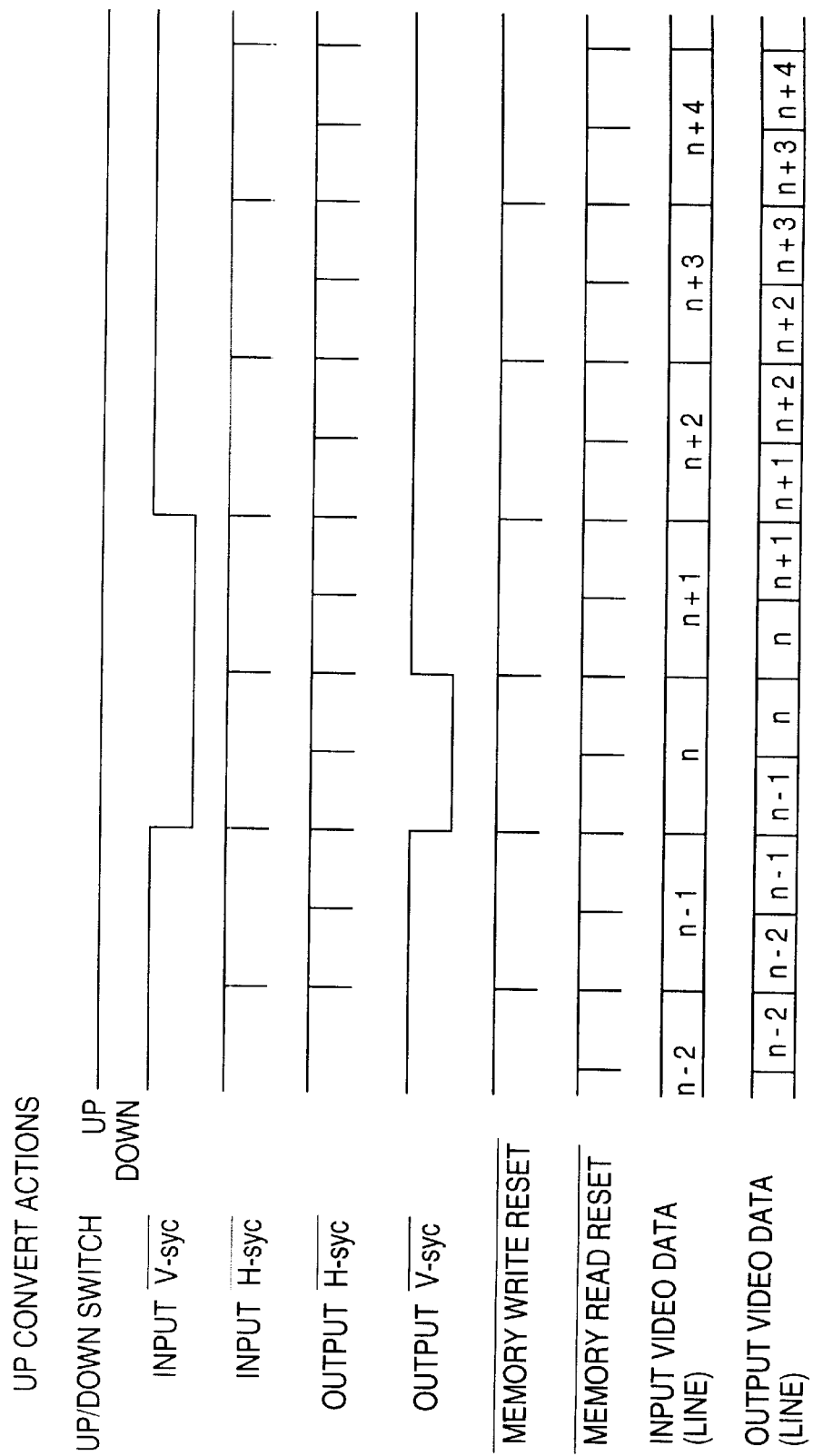
FIG. 6 is a timing chart illustrating the up actions of the up/down converter of the recording/reproducing device according to Embodiment 1 of the present invention.

Here, the input/output signals of the individual units of the aforementioned up/down converter 26 in the down-convert operations are illustrated in FIG. 5, an the input/output signals of the individual units in the up-convert operations are illustrated in FIG. 6.

Here will be described the actions of the recording/reproducing device 60 thus constructed.

Descriptions will be made at first upon the individual operations in the mode (as will be called the "EE system") for displaying the input image as it is for both the action (as will be called the "D-convert") of the converter A62 and the action (as will be called the "U-convert") of the converter B65, and then upon the operations of the recording system in the D-convert action and the reproducing system in the U-convert action.

[Actions of EE (Electric-Electric) System]

As shown in FIG. 1, the RF signals, as inputted from the antenna input terminal 15, are converted by the tuner 3 into video signals. On the other hand, the RGB signals, as inputted from the RGB input terminal 61, are sent to the converter A62. Then, either of the signals of the tuner 3 and the converter A62 are selected by the change-over switch A63.

The signals, as selected by the change-over switch A63, are inputted through the recording block 5 and the reproducing block 7 to the converter B65 so that they are converted by the converter B65. Moreover, either of the signals of the input of the RGB input terminal 61 and the converter B65 is selected by the change-over switch B66. If the input of the RGB input terminal 61 is selected, the through mode is established so that the signals, as inputted to the VTR 60, of the personal computer 10 or the like are outputted as they are from the RGB output terminal 67 to the display monitor 20.

In this case of the up/down convert in the operations of the EE system, the actions are changed, as follows, in dependence upon the input selecting content.

Figure 7:
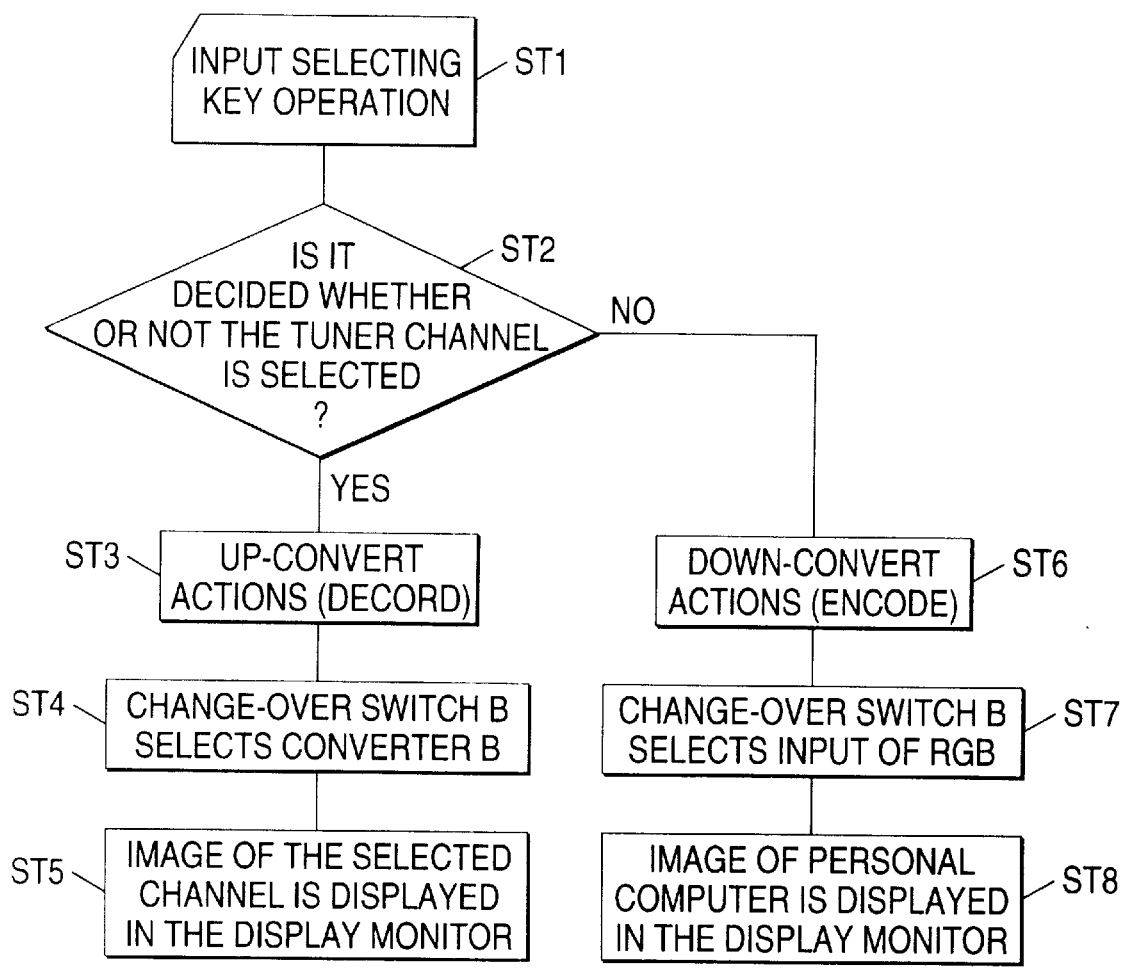
FIG. 7 is a flow chart showing the input selecting actions of the EE system of the recording/reproducing device according to Embodiment 1 of the present invention.

FIG. 7 is a flow chart showing the input selecting operations of the EE system. In FIG. 7, letters ST indicate steps of the flow.

At first step ST1, either the tuner channel or the RGB input is selected by the (not-shown) channel selecting key which is located on the front face of the converter built-in VTR 60.

At step ST2, it is decided whether or not the tuner channel is selected. When this tuner channel is selected, the U-convert action comes in at step ST3. At step ST4, the change-over switch 63 selects the tuner 3 whereas the change-over switch B66 selects the converter B65. As a result, at step ST5, the signals, as inputted from the antenna input 15, are converted and outputted to the RGB output terminal 67 so that the image of the selected channel is displayed in the display monitor 20 or the like.

When the tuner channel is not selected, on the other hand, the D-convert action comes in at step ST6. At step ST7, the change-over switch A63 selects the input of the RGB input terminal 61. As a result, at step ST8, the signals, as inputted from the input of the RGB input terminal 61, are converted and outputted to the video output terminal 17 so that the image of the personal computer 10 or the like is displayed in the TV set 21 or the like.

[Actions of Recording System]

The VGA signals, as inputted from the personal computer 10 or the like shown in FIG. 1 to the RGB input terminal 61, are inputted to and converted by the converter A62. The video signals thus converted are recorded through the recording block 5 on the video tape 2 by the magnetic recording/reproducing block 6. The recording process from the recording block 5 to the video tape 2 is similar to that of the ordinary home VTR.

By the flow thus far described, the signals of the personal computer 10 or the like can be recorded by the VTR 60.

[Actions of Reproducing System]

The signals, as recorded on the video tape 2, are demodulated through the magnetic recording/reproducing block 6 and the reproducing block 7 into TV signals, which are inputted to and converted by the converter B65. This converter B65 is selected by the change-over switch B66 so that the image of the tuner 3 is outputted to the RGB output terminal 67.

By the flow thus far described, the video signals, as reproduced by the VTR 60, can be displayed on the display monitor 20 of a different signal scanning system.

At the D-convert time, that is, when the image of the personal computer 10 or the like shown in FIG. 1 is either recorded by the VTR 60 or outputted from the video output terminal 17, the function of the converter B65 is not needed. At the U-convert time, that is, when the signals of the antenna input terminal 15 or the reproduced signals of the VTR 60 are outputted to the RGB output terminal 67, on the other hand, the function of the converter A62 is not needed.

In the present embodiment, therefore, when the signals from the converter A62, i.e., the input of the RGB input terminal 61 is selected, the change-over switch B66 is forced to select the input of the RGB input terminal 61. In this construction, the converter A62 and the converter B65 need not be simultaneously active although the functions per se are identical to those of the aforementioned example of the prior art shown in FIG. 12.

From this point of view, in the present embodiment, the functions of the converter A62 and the converter B65 are switched for use by the single up/down converter 80, as shown in FIG. 3.

Here will be described in detail the actions of the up/down converter 80 with reference to FIGS. 8 and 9.

A first description is made upon the action as the converter B65, i.e., the U-convert action.

Figure 8:
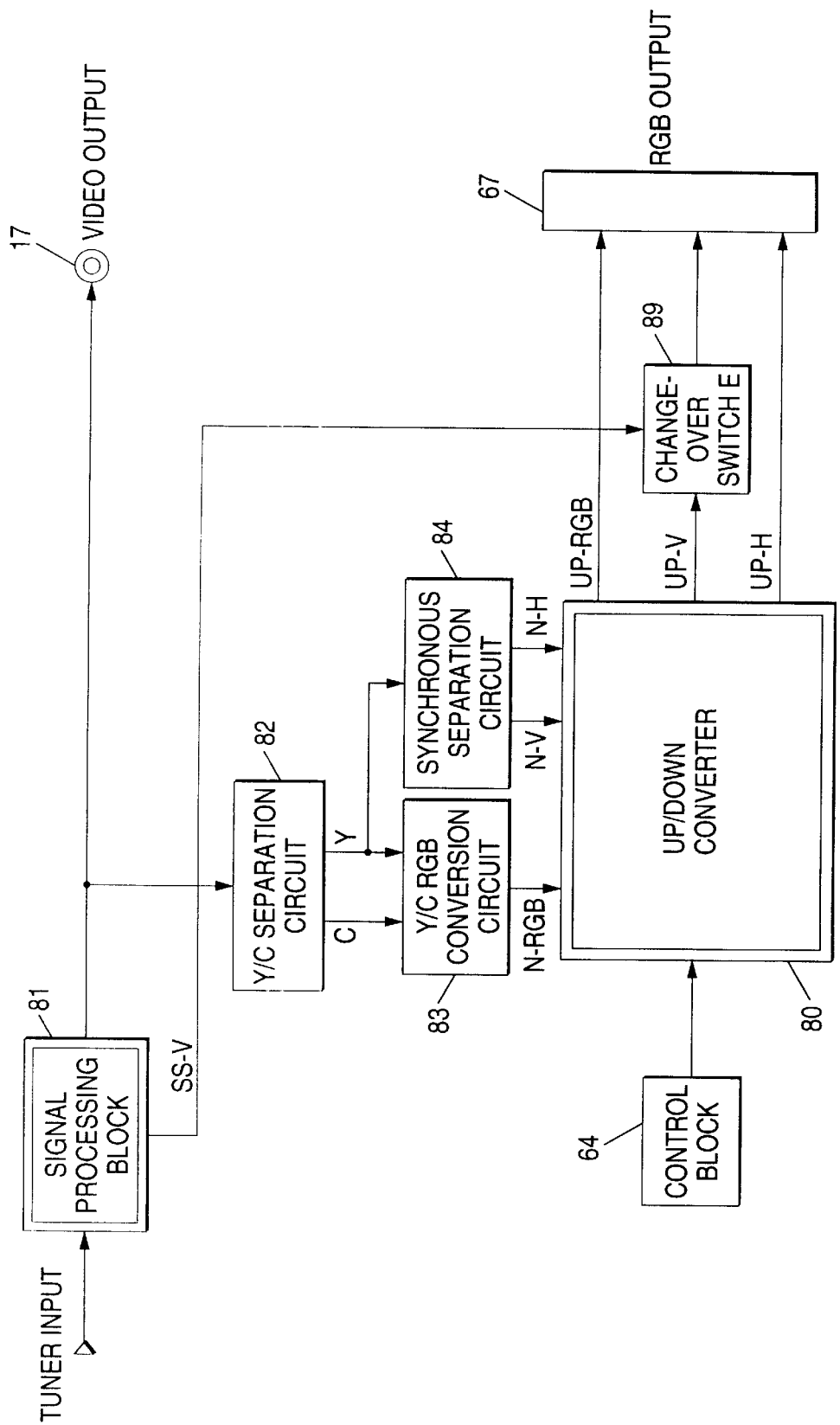
FIG. 8 is a block diagram for explaining the actions at the down-convert time of the up/down converter of the recording/reproducing device according to Embodiment 1 of the present invention.

FIG. 8 shows a circuit of the action portion, as extracted from FIG. 3, for the U-convert time.

In FIG. 8: reference numeral 81 a signal processing block for processing the video signals; numeral 82 a Y/C separation circuit for separating the luminance signals (Y) and the color signals (C) from the video signals; numeral 83 a Y/C-RGB conversion circuit for converting the luminance signals and the color signals into the RGB signals; numeral 84 a synchronous separation circuit for separating the vertical and horizontal synchronizing signals from the luminance signals; numeral 80 an up/down converter for converting the signals inputted from the Y/C-RGB conversion circuit 83 and the synchronous separation circuit 84; numeral 64 a control block for controlling the up/down converter 80 and the individual change-over switches; numeral 89 a change-over switch E for selecting and outputting one of the vertical synchronizing signals, as outputted from the up/down converter 80 and the signal processing block 81; numeral 67 an RGB output terminal for outputting the RGB signals and the horizontal synchronizing signals, as outputted from the up/down converter 80, and the vertical synchronizing signals, as selected by the change-over switch E89, to the outside of the VTR 60; and the numeral 17 a video output terminal for outputting the video signals from the signal processing block 81 to the outside.

The video signals, as outputted from the tuner, are inputted through the signal processing block 81 to the Y/C separation circuit 82. The luminance signals (Y) and the color signals (C), as separated by the Y/C separation circuit 82, are sent to and converted by the Y/C-RGB conversion circuit 83 into the RGB signals, which are then inputted to the up/down converter 80.

Moreover, the luminance signals (Y), as outputted from the Y/C separation circuit 82, are also sent to and separated by the synchronous separation circuit 84 into the horizontal synchronizing signals (H) and the vertical synchronizing signals (V), which are then inputted to the up/down converter 80.

This up/down converter 80 is controlled by the control block 64 to act as the U-converter so that the converted synchronizing signals (UP-V and UP-H) and the RGB signals converted with the scanning lines are outputted to the RGB output terminal 67.

By the operations thus far described, the signals of the tuner can be displayed as the RGB signals on the display monitor or the like of the computer.

Here will be described the converter A62, i.e., the D-convert operation.

Figure 9:
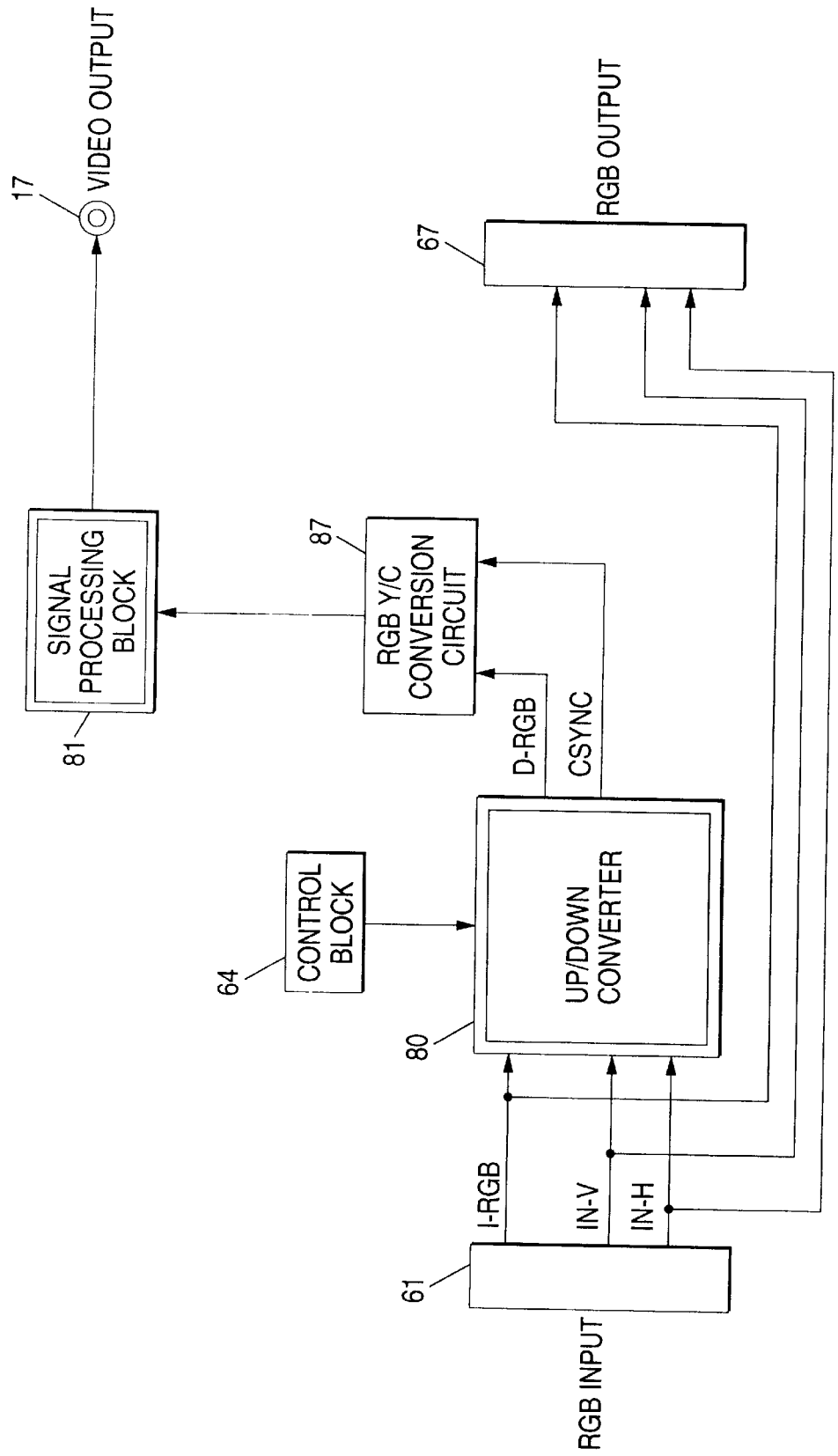
FIG. 9 is a block diagram for explaining the actions at the up-convert time of the up/down converter of the recording/reproducing device according to Embodiment 1 of the present invention.

FIG. 9 shows a circuit of the action portion, as extracted from FIG. 3, for the D-convert time.

In FIG. 9: reference numeral 61 designates an RGB input terminal for inputting the RGB signals from the personal computer or the like; numeral 81 a signal processing block for processing the video signals; numeral 80 an up/down converter for converting the signals, as inputted from the change-over switch B85 and the change-over switch C86 (of FIG. 3); numeral 64 a control block for controlling the up/down converter 80 and the individual change-over switches; numeral 87 an RGB-Y/C conversion circuit for converting the RGB signals and the composite synchronizing signals, as outputted from the up/down converter 80; numeral 67 an RGB output terminal for outputting the RGB signals and the synchronizing signals, as coming from the input of the RGB input terminal 61, to the outside of the VTR 60; and numeral 17 a video output terminal for outputting the video signals from the signal processing block 81 to the outside.

The RGB signals, as inputted from the RGB input terminal 61, are inputted to the up/down converter 80. This up/down converter 80 is controlled by the control block 64 to act as the D-converter so that the converted synchronizing signals and the scanning-line converted RGB signals are sent to the RGB-Y/C conversion circuit 87. The RGB signals and the synchronizing signals are converted by the RGB-Y/C conversion circuit 87 into the video signals, which are sent to the signal processing block 81. The signals are processed by the signal processing block 81 so that they are outputted through the video output terminal 17 or recorded in the VTR.

By the operations thus far described, the RGB signals of the computer or the like can be displayed as the video signals in the TV set or recorded in the VTR.

FIG. 4 is a detailed circuit diagram of the aforementioned up/down converter 80; FIG. 5 is a timing chart illustrating the timings of the control signals to be outputted from a timing generator 35 for the scanning line conversions (i.e., the D-convert) to convert the VGA signals into the NTSC signals; and FIG. 6 is a timing chart illustrating the timings of the control signals to be outputted from the timing generator 35 for the scanning line conversions (i.e., the U-convert) to convert the NTSC signals into the VGA signals. In FIGS. 5 and 6, the signal names, as set to the individual timings, correspond to the signals of the corresponding portions shown in FIG. 4.

The actions of the up/down converter 80 will be described in detail with reference to FIGS. 3, 4 and 5.

The up/down converter 80 is switched in its actions by the signals which are set by the internal control mode discriminator 98 in response to an up/down function switching input. Here, it is assumed that the down-processing is executed at the "L" inputting time whereas the up-processing is executed at the "H" inputting time.

The VGA and NTSC signals to be inputted are as follows.
VGA signals:
  Horizontal synchronizing signals of 31.5 KHz,
  Vertical synchronizing signals of 60 Hz, and
  Interlace, Dot clock of 25 MHz; and
NTSC signals:
  Horizontal synchronizing signals of 15.75 KHz,
  Vertical synchronizing signals of 60 Hz, and
  Interlace, Dot clock of 14 MHz.

The operations at the down-convert signal processing time will be described with reference to FIG. 5.

The up/down converter 80 is fed with the analog RGB input, the vertical synchronizing signals V-syc (60 Hz) and the horizontal synchronizing signals H-syc (31.5 KHz) of the VGA signals.

First of all, by the PLL circuit 95 (as shown in FIG. 4) in the up/down converter 80, there are generated the video dot clocks of 25 MHz which are determined in the input video signals synchronized with the input H-syc. These clocks are used as the write clocks for timing the A/D converter 91 and the buffer memory 92. Moreover, the write dot clocks of the half frequency of 12.5 MHz are used as the outputting read clocks for timing the reads of the D/A converter 93 and the buffer memory 92.

Next, three kinds of control signals are generated by making the memory write resetting timing with the one half period of the input H-syc, by making the signal memory write enable to be inverted at each input H-syc, and by making the memory read reset at the rising timing of the memory write enable.

The RGB signals of the A/D converter 91 are consecutively inputted as horizontal line signals. The horizontal lines of the VGA signals thus inputted are individually given numbers 1 to 525.

At the aforementioned memory write enabling timing, the data are alternatively written in the buffer memory 92 so that the video data can be outputted at a half period (15.75 KHz) by reading and outputting the data at the memory read resetting timing.

The operations at the up-convert signal processing time will be described with reference to FIG. 6.

The up/down converter 80 is fed with the signals, as converter into the analog RGB, of the NTSC signals, and the vertical synchronizing signals V-syc (60 Hz) and the horizontal synchronizing signals H-syc (15.75 KHz).

First of all, by the PLL circuit (as shown in FIG. 4) in the up/down converter 80, there are generated the video dot clocks of 28 MHz (or 8 fsc) to be used for the output video signals synchronized with the inputted H-syc. These clocks are used as the read clocks for timing the D/A converter 93 and the buffer memory 92. The read dot clocks of one half frequency of 14 MHz (or 5 fsc) are used as the outputting read clocks for timing the writer of the D/A converter 93 and the buffer memory 92.

Next, two kinds of control signals are generated by making the memory write reset timings according to the period of the input H-syc, and by making the memory read rests with the period two times as long as that of the input H-syc.

The horizontal lines of the VGA signals thus inputted are numbered across the n-line, as shown in FIG. 6.

Video data of a double period (31.5 KHz) can be outputted by writing the data in the buffer memory 92 at the aforementioned memory write reset timing and by reading and outputting the data at the memory read reset timing.

If the signals to be inputted to the up/down function switching input are switched in synchronism with the switching of the video signals, the converter function A (i.e., the down-convert) and the converter function B (i.e., the up-convert) can be switched without changing the converter input/output circuit construction.

As has been described hereinbefore, the recording/reproducing device according to Embodiment 1 is constructed to comprise: the RGB input terminal 61; the converter A62 for converting the RGB signals into the video signals; change-over switches A63 and B65 for selecting and outputting one of the input signals; the recording block 5 for recording/reproducing the video signals; the magnetic recording/reproducing block 6; the reproducing block 7; the control block 8 for controlling the entire system; the control block 64 for instructing the switching of the up-convert function / the down-convert function of the converters A62 and B65; the converter B65 for converting the video signals into the RGB signals; the video output terminal 17; and the RGB output terminal 67. Moreover, the converters A62 and B65 are constructed of the single up/down converter 80 having the functions of both the converter A62 and the converter B65. In addition to the recording/reproducing function of the TV signals, it is possible to convert the two signal systems into each other between the signal of the TV signal system and the signals of another system (i.e., the second signal system). Thus, there can be attained effects of making it possible to display the TV signals or the reproduced video signals of the recorder on the monitor or the like corresponding to the second signal system, to display the video signals of the second signal system on the home TV set by the scanning line conversions, and to record the video signals of the second signal system by the ordinary recorder signal processing.

In the operations of the up/down converter 80, moreover, at the time of inputting the personal computer (PC) image, in response to the image input selecting operations, the PC image is passed through from the VGA input unit to the output unit to eliminate the mode in which two convert functions (i.e., the up-convert and the down-convert) have to be simultaneously effected as in the prior art by using two converters. Moreover, the similar portions of those converter units are shared to give the UP/DOWN switching command to the A/D converter and the timing generator so that the timing generating patterns capable of switching one converter unit operation among the UP function / the DOWN function and the special reproduction mode can be produced.

As a result, the mode of operating the two converters simultaneously can be structurally eliminated without deteriorating the operability. Thus, there are attained effects that the parts necessary for constructing the two scanning line conversion structures can be shared, and that the scanning line conversion unit capable of converting the two video signal systems can be made parts.

Merely by connecting the present recording/reproducing device 60 with the personal computer 10 and the display monitor 20, moreover, the image, as displayed on the monitor 20, can be recorded as the TV signals by the down-convert processing, and the reproduced signals can be projected on the monitor 20 by the up-convert processing. Thus, the TV signals can be simply seen on the personal computer monitor thereby to facilitate the fusion between the personal computer and the TV set.

For example, a video set can be easily connected with the personal computer being used with the monitor, so that the video program can be easily introduced into the environment using the personal computer. Then, the image of the personal computer can be recorded in the video set.

Moreover, the personal computer and the video set can be easily fused into one. It may be desired to see the video program where the personal computer is present. In this environment using the personal computer, it is unnecessary to prepare the TV set while taking a trouble, where the video set is to be used. Nor is it necessary to prepare two monitors for the present embodiment and the video set.

Moreover, the converters are built in the video set so that no spare space is required. Specifically, what is required is to connect the video set and the personal computer and further the video set and the monitor.

By these connections, the TV signals can be easily seen in the personal computer monitor, and the signals of the personal computer can be recorded in the video set.

When an image on the personal computer monitor is to be recorded in the example of the prior art, still moreover, an external storage medium such as a hard disk has to be used, and even the hard disk having a capacity of several Gbytes can record motion picture data of about 15 minutes at the longest. In addition, the cost for the medium is high. In the case of recording the VTR by the present recording/reproducing device 60, on the other hand, the motion picture data can be recorded at a low cost and for a period as long as about 500 minutes.

Here in the recording/reproducing device 60 of Embodiment 1, the converter B65 is left inactive when the converter A62 is activated. When the action of the converter B65 is inhibited, the input signals (i.e., the second signals) from the personal computer may be passed through the change-over switch B66 without being converted, so that they may be outputted to the display monitor 20. In other words, the recording can be achieved merely by activating the converter A62, and the signals, as inputted from the personal computer to the VTR, are outputted not through the converters but through the change-over switch B66 to the display monitor 20.

Thus, the degradations of the signals can be suppressed because the converter B65 need not be activated but bypassed.

Here, the foregoing Embodiment 1 is exemplified by the mutual conversions between the VGA signals (having the horizontal period: 31.5 KHz) and the NTSC signals (having the horizontal period: 15.75 KHz), and has been described on the timing example which can be realized by one line of inexpensive buffer memories with reference to FIGS. 5 and 6. If the buffer memory 92 of FIG. 4 is exemplified by a field memory or a frame memory capable of recording the entire screen temporarily, mutual conversions can be made between the signals which are set at times of no integer. For example, it is possible to effect the mutual conversions between the signals such as NTSC —SVGA (having a horizontal period: 35.2 MHz), in which the period of the synchronizing signals is set by times of no integer with respect to the NTSC signals.

Embodiment 2

Figure 10:
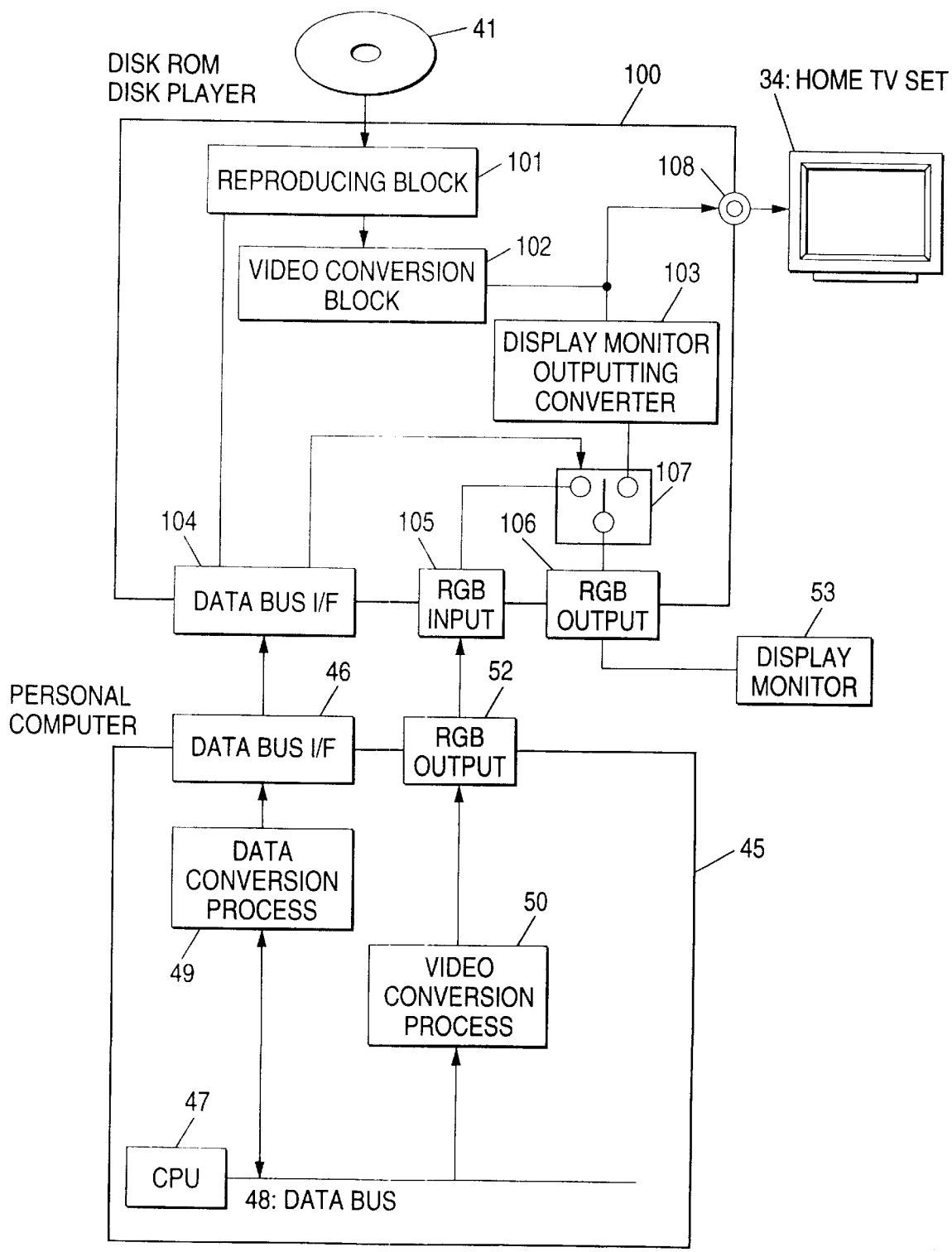
FIG. 10 is a block diagram showing a construction of a recording/reproducing device according to Embodiment 2 of the present invention.
Figure 13:
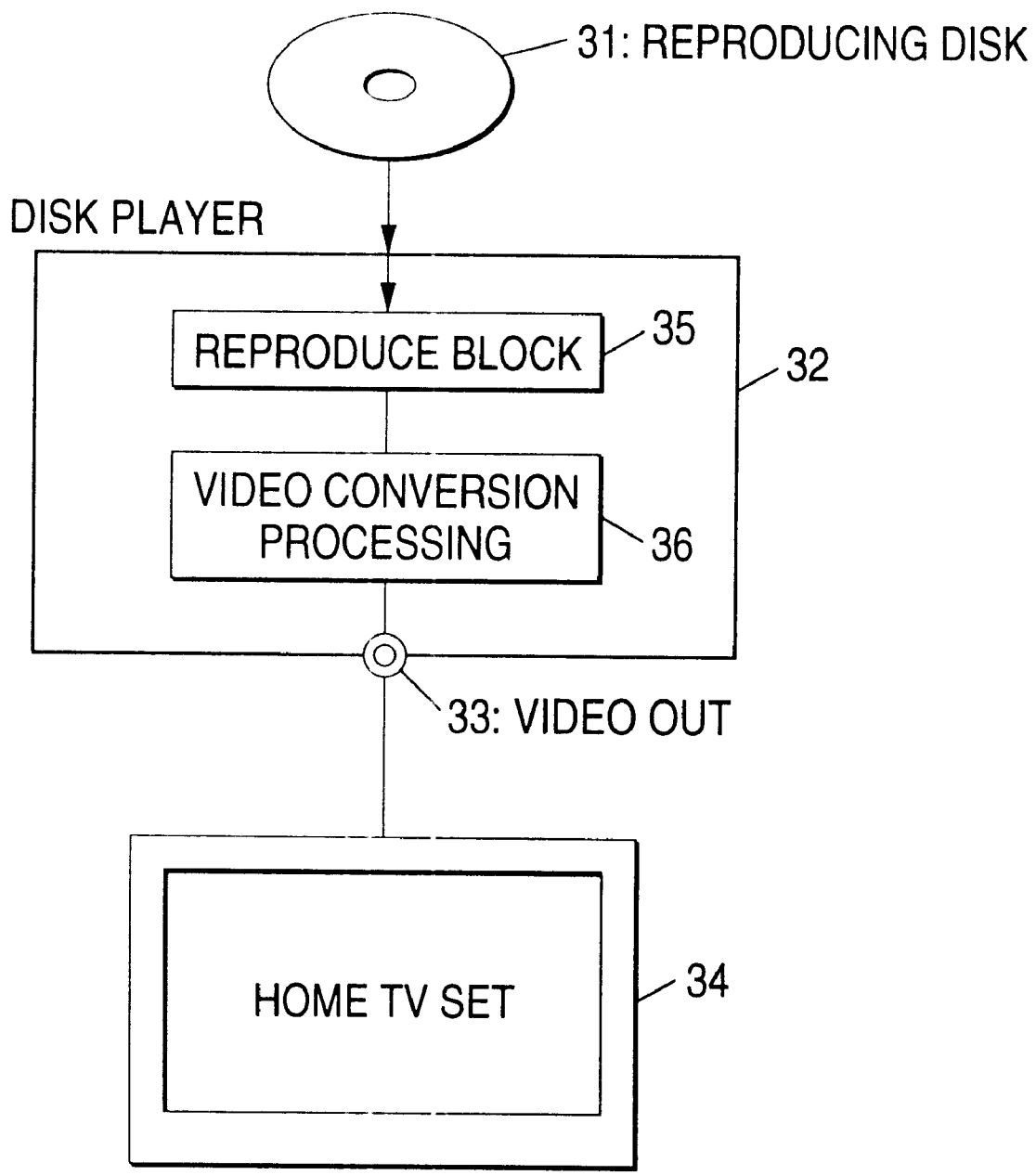
FIG. 13 is a block diagram showing a construction of the disk device of the prior art.
Figure 14:
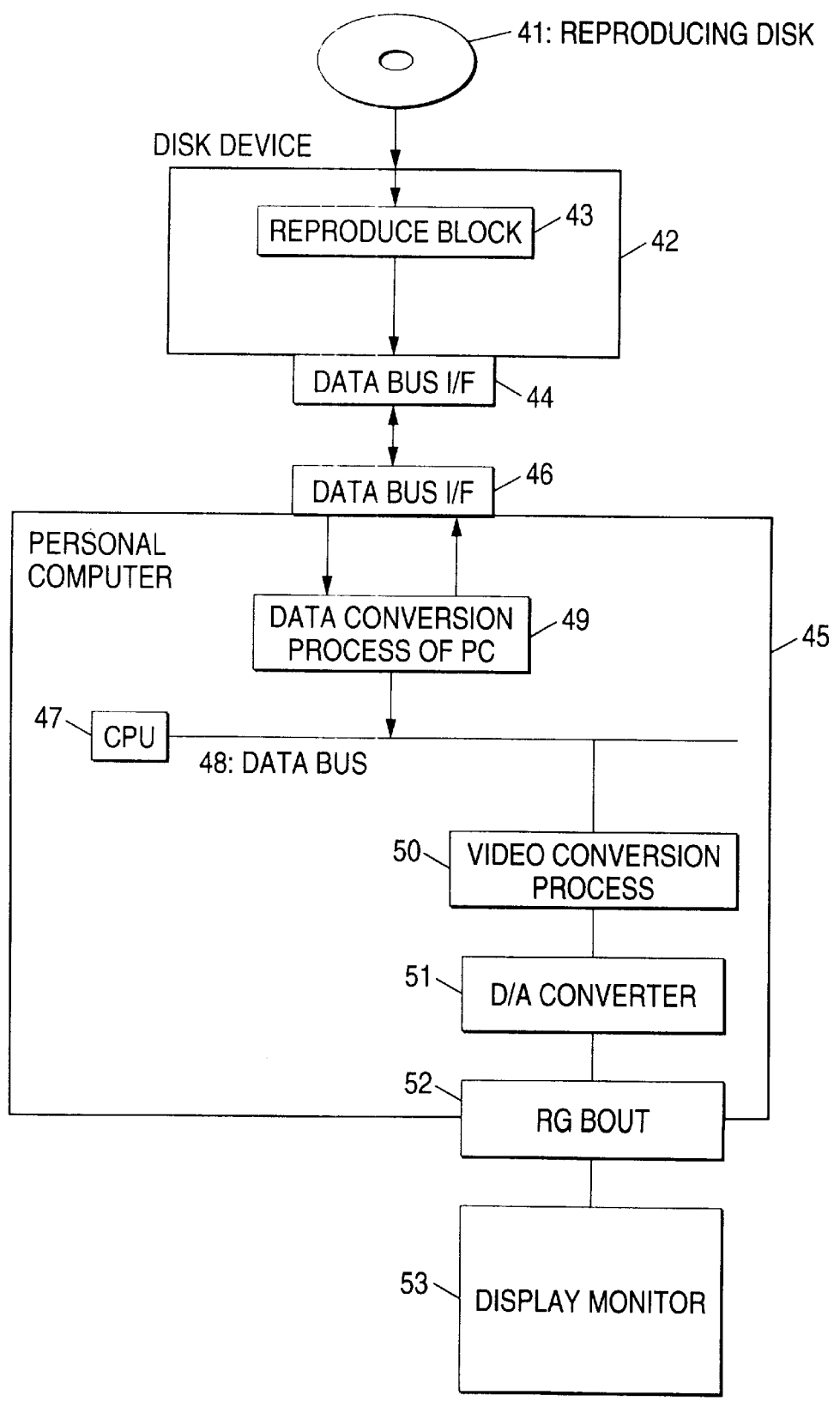
FIG. 14 is a block diagram showing constructions of the disk device of the prior art and a personal computer.

FIG. 10 is a block diagram showing a construction of a recording/reproducing device according to Embodiment 2 of the present invention. This Embodiment 2 provides a recording/reproducing device which reduces a load upon the CPU by causing the display monitor to display the screen of the computer and the reproduced image of the player. Upon the description of the recording/reproducing device of Embodiment 2, the components identical to those of the aforementioned recording/reproducing device shown in FIGS. 13 and 14 are designated by the common reference numerals, and their description will be omitted.

FIG. 10 is a diagram showing a construction to be used in a disk ROM disk player.

In FIG. 10: reference numeral 41 a reproducing disk made of a disk ROM; numeral 100 a disk system; numeral 102 a reproducing block for reproducing the signals recorded in the reproducing disk 41; numeral 102 a video conversion block; numeral 103 a display monitor outputting converter; numeral 104 a data bus interface (I/F) to be connected with a personal computer; numeral 105 an RGB video input terminal; numeral 106 an RGB video output terminal for outputting video signals to a display monitor 53; numeral 107 a change-over switch (or signal switching means) for switching the RGB input and the RGB output in response to a switching command; and numeral 108 a video output terminal with which is connected a home TV set 34.

The aforementioned disk system 100 is equipped with the data bus interface (I/F) 104, the RGB video input terminal 105 and the RGB video output terminal 106, and can take a construction similar to that of the recording/reproducing device 60 according to the foregoing Embodiment 1.

Here will be described the actions of the disk system 100 thus constructed.

The description will be made at first on the overall actions of the disk system 100 and then on the data paths for the images when the system is used as the disk player and as the disk ROM.

[Overall Actions of Disk System 100]

When the system is used as the data reproducing device, the data of the disk ROM are once inputted through the data bus interface (I/F) 104 to a data bus interface (I/F) 46 of a personal computer 45 so that they may be processed through a CPU 47 in the personal computer 45.

When the system is used as the video reproducing device, the following two paths are prepared for the applications.

On the first path, when the video data have to be fetched and processed in the personal computer 45, they are processed by the video conversions in the personal computer 45 into the RGB signals, as in the aforementioned data reproducing device, and are returned to the disk system 100 so that they are displayed by the display monitor 53.

The second path is provided merely for observing the image. In this case, the data are converted by the disk system 100 into video signals and further by the display monitor outputting converter 103 into the display monitoring signal system so that they are displayed in the display monitor 53.

By the aforementioned two paths, the actions of the personal computer 45 are not required for the case of the image observation so that no load is applied to the CPU. As a result, there is achieved an effect that the images can be observed without any problem while another heavy signal processing against the CPU is being executed in parallel on the personal computer 45.

Using as a Disk Player (as shown in FIG. 10):
    Signals from Disk—Converter 103—
    Change-over Switch 107—RGB Output—
    Display Monitor 53

Case Using Case as a Disk ROM (as shown in FIG. 10):
    Data from Disk—Data Bus 48—Personal Computer 48—
    Personal Computer 45—Video Conversion—
    Input to Disk ROM—Change-over Switch 107—
    RGB Output—Display Monitor 53

Thus, this disk system 100 has the two functions as the DVD player and the DVD-ROM device, of which the former reproduces a disk recorded with video data of a movie or the like whereas the latter reads a disk stored with a predetermined software, or data or video data to be used in the personal computer.

When the disk device of the prior art is used as the DVD player, for example, the video signals are once inputted to the personal computer so that the data on the image are converted in the personal computer into video signals.

In the present embodiment, on the other hand, the disk system 100 is equipped with the converter 103 and the change-over switch 107. When the disk device is used as the DVD player, therefore, the video signals need not be inputted to the personal computer but can be processed in the disk device so that the video signals need not be processed by the software in the personal computer but can be outputted to the display monitor merely by processing them by the hardware in the disk device. The software processing generally corrects errors or omits the frames for the video signals so that the signal quality is deteriorated. In the present embodiment, however, this signal deterioration can be avoided.

In the example of the prior art, on the other hand, the conversion of signals is repeated to make the signal deterioration seriously defective. In the present embodiment, however, the signal conversion can be minimized to provide an effect that the signal deterioration, as might otherwise follow the signal conversion, is remarkably reduced.

The disk system 100 having the aforementioned feature is suitably used as the DVD-ROM device, for example. In this use, the disk device (i.e., the disk system 100) is connected with the personal computer or the like, and the personal computer display monitor is used as the monitor. When the DVD-ROM is read, the signals are inputted as usual to and processed by the personal computer. The processed signals are outputted from the personal computer and then inputted again to the disk system 100 so that they are outputted through the change-over switch 107 to the display monitor 53.

When the disk device in this state is to be used as the disk player, too, in order to avoid the load upon the CPU 47 of the personal computer 45, the change-over switch 107 of the disk system 100 is switched so that the signals can be not inputted to the personal computer 45 but processed by the hardware in the disk system 100.

Specifically, the disk device is premised for the application to the personal computer. When this disk device reproduces the DVD which is recorded with the video data of a movie, the data need not be processed in the personal computer but can be processed only in the disk device and outputted to the display monitor. In other words, when a software (e.g., the video data of the LD or DVD) requiring no processing in the computer is to be reproduced, the signals need not be outputted from the disk device to the personal computer but can be processed in the disk device.

Embodiment 3

Figure 11:
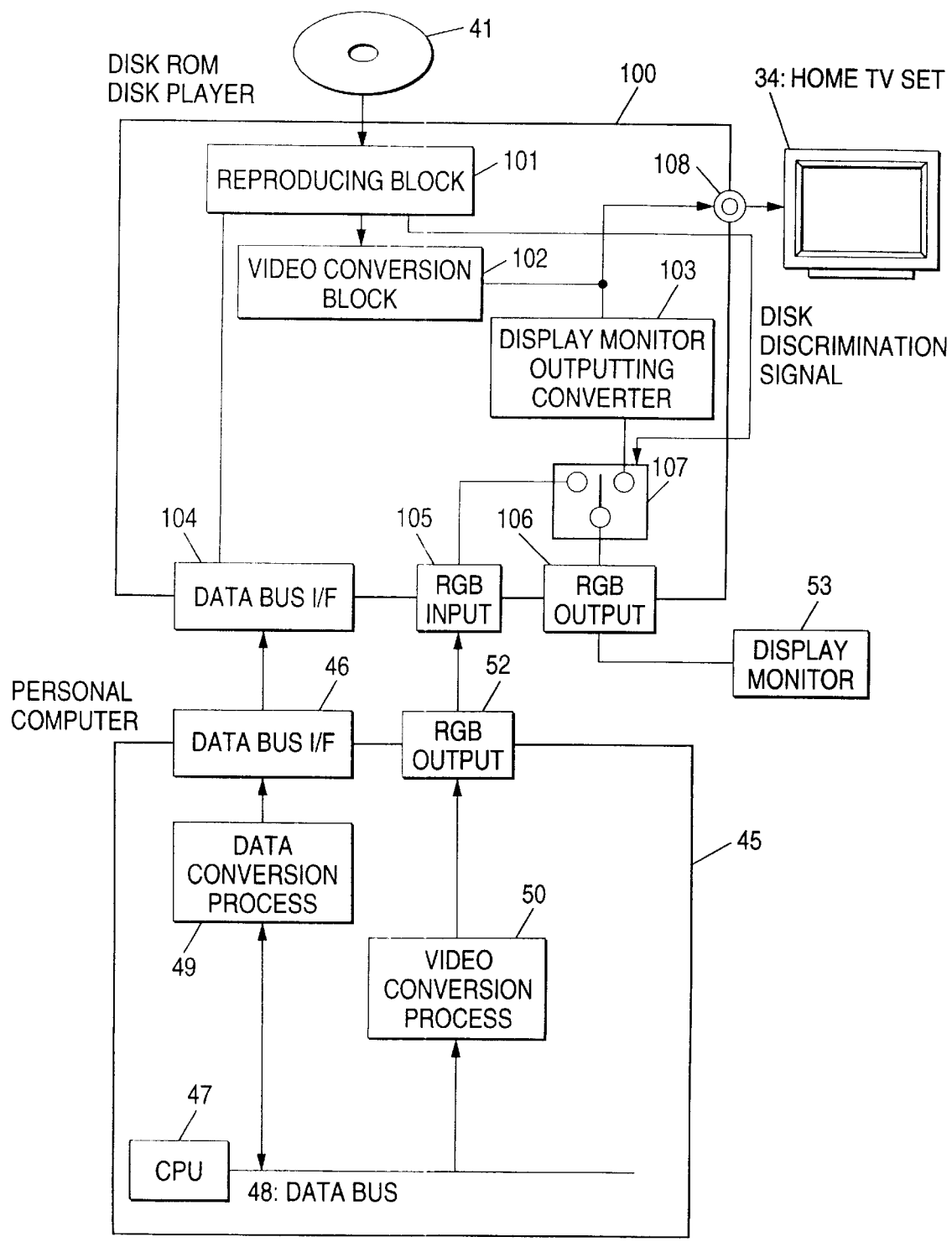
FIG. 11 is a block diagram showing a construction of a recording/reproducing device according to Embodiment 3 of the present invention.

FIG. 11 is a block diagram showing a construction of the recording/reproducing device according to Embodiment 3 of the present invention. This Embodiment 3 provides a recording/reproducing device capable of reducing the load upon the CPU by causing the display monitor to display the screen of the computer and the reproduced image of the player. Upon the description of the recording/reproducing device of Embodiment 3, the components identical to those of the aforementioned recording/reproducing device shown in FIG. 10 are designated by the common reference numerals, and their description will be omitted.

FIG. 11 is a diagram showing a construction to be used in the disk ROM disk player and an example of the construction of a disk device for discriminating disks automatically.

As shown in FIG. 11, a disk discriminating signal is inputted from a reproducing block 101 to a change-over switch 107 so that the change-over switch 107 switches the signals in response to the disk discriminating signal.

Here, since the disk is recorded with the disk discriminating signal, it is easy to discriminate which of the CD-ROM or the video CD the disk belongs to.

Here will be described the actions of the disk system thus constructed.

When the disk device is set with a disk, it is discriminated which of the DVD-ROM or the video DVD the set disk belongs to. The disk discrimination signal is then outputted to the change-over switch 107 so that the change-over switch 107 changes the signals in response to the disk discrimination signal.

Thus, the present disk device performs the automatic discrimination of disks and switches the signal paths automatically, if the disk is the video DVD or the like, so that the read video data are not outputted to the outside of the personal computer or the like but are directly displayed in the monitor.

As a result, when the disk (e.g., CD or DVD) of a video software is reproduced, no signal passes through the personal computer so that the signals can be neither fetched nor duplicated by using the personal computer thereby to prevent an infringement of the copyright in advance.

Here, in the foregoing Embodiments 2 and 3, the data bus I/F and the RGB output are illustrated as different terminals, but the construction may be modified to incorporate the data bus I/F into the RGB output portion. As to the input/output connector of the disk device, for example, the data terminal and the RGB signal terminal may be integrated. In this modification, the disk device and the personal computer are connected through a single cable so that the signals of the data terminal and the RGB signals are transmitted through that cable.

Moreover, the recording/reproducing device according to the aforementioned Embodiments 2 and 3 is applied to the ROM disk player, as described above, but can naturally be applied any medium device such as a device to be used as the DVD (Digital Video Disk) recorder, if it performs the recording/reproducing operations. Still moreover, the device according to the aforementioned Embodiments 2 and 3 is applied to the recording/reproducing device but can naturally be applied to a device only for reproductions.

The numbers, kinds and connections of circuits, switches and terminals constructing the recording/reproducing device according to each of the aforementioned embodiments should not naturally be limited to those of the aforementioned embodiments, but their circuit or the like may be partially or wholly integrated into a signal chip. For example: the video signals may be the YUV; the RGB input/output terminal may be the S terminal; and the VGA mode may be the SVGA or XVGA mode or the like having a higher resolution.

A recording/reproducing device, comprising: recording/reproducing means for recording/reproducing TV signals; input means for inputting second signals of a system other than the TV signal system; and first conversion means capable of converting the second signals into the same signals as those at the TV signal recording time, wherein the second signals can be recorded by the conversion means. As a result, in addition to the function to record/reproduce the TV signals, the signals of the two systems of the TV signal system and another system can be mutually converted to provide effects that the TV signals, the reproduced video signals of the recorder and the video signals of the second signal system can be displayed on the home TV set by the scnning line conversion, and that the video signals of the second signal system can be recorded by the signal processing of an ordinary recorder.

A recording/reproducing device, comprising: recording/reproducing means for recording/reproducing TV signals; input/output means for inputting/outputting the TV signals and the second signals; and second conversion means capable of the TV signals into the second signals, wherein the recorded signals can be converted into the second signals and outputted. As a result, in addition to the function to record/reproduce the TV signals, the signals of the two systems of the TV signal system and another system can be mutually converted to provide effects that the TV signals and the reproduced video signals of the recorder can be displayed on the monitor or the like corresponding to the second signal system, and that the video signals of the second signal system can be recorded by the signal processing of the ordinary recorder.

A recording/reproducing device, comprising both the first conversion means and the second conversion means, wherein while one of the conversions by the first conversion means and the second conversion means is active, the other conversion is inhibited. As a result, the mode of activating the two converters simultaneously can be eliminated in a structural manner without deteriorating the operability thereby to share the components necessary for the two scanning line conversion structure. This raises an effect that the scanning line conversion unit for mutual conversions between the two scanning line conversion structures can be constructed of fewer components.

A recording/reproducing device further comprising: switch means capable of outputting the second signals, before converted by the first conversion means, as they are to a display for outputting the second signals when the first conversion means is active. As a result, no passage through one conversion means is required so that the deterioration of the signals can be suppressed.

A recording/reproducing device where, the conversion means includes one converter capable of switching, in response to a predetermined control signal, the first conversion to convert the second signals into the same signals as those at the TV signal recording time and the second conversion to convert the TV signals into the second signals. As a result, the single scanning line conversion unit can convert the two video signal systems into each other thereby to provide an effect that the conversion unit can be made of fewer.

A recording/reproducing device where, the converter includes: an input unit for video signals; an A/D converter for converting the video signals into predetermined digital signals; a buffer memory for storing digital data temporarily; a D/A converter for converting digital video signals into analog video signals; an output unit for video signals; and a timing generator for generating timing signals to control the above-specified inclusive. By feeding an UP/DOWN switching command to the A/D converter and the timing generator, it is possible to generate a timing generating pattern capable of switching one converter unit operation between the UP function/the DOWN function, and a special reproduction mode.

A recording/reproducing device where the horizontal synchronizing signal period of VGA (Video Graphic Array) signals, as inputted to the converter, is doubled for the conversions from the horizontal synchronizing signal period of NTSC signals. As a result, the image, as displayed on the monitor, can be recorded as the TV signals by the down-convert processing, and the reproduced signals can be projected on the monitor by the up-convert processing.

A recording/reproducing device further comprising: a disk unit capable of reproducing a disk, wherein the disk unit includes: the conversion means; and signal switching means for switching the outputs of the video signals connected with the conversion means and predetermined RGB signals. As a result, the video signals can be processed in the disk device without being inputted to the personal computer or the like, so that they can be prevented from being deteriorated.

What is claimed is:

1. A recording/reproducing device comprising:
   recording/reproducing means for recording/reproducing TV signals;
   input/output means for receiving signals from a system other than a TV signal system; and
   conversion means capable of converting said received signals into a format compatible with a signal from the TV signal system, and capable of converting said TV signals into said received signals,
   wherein said received signals are capable of being recorded by said conversion means;
   said conversion means further comprising D/A conversion means which performs up/down conversion and switches recording/reproducing and displaying;
   wherein said conversion means includes a single converter capable of being switched, in response to a predetermined control signal, to convert the received signals into the format compatible with the signal from the TV signal system and to convert the TV signals into the received signals; and
   wherein said converter includes:
     an input unit for the video signals;
     an A/D converter for converting the video signals into predetermined digital signals;
     a buffer memory for temporarily storing digital data;
     a D/A converter for converting digital video signals into analog video signals;
     an output unit for the video signals; and
     a timing generator for generating timing signals to control said input unit A/D converter, buffer memory, D/A converter, and output unit.

2. The recording/reproducing device of claim 1, said input/output means further
   inputting/outputting said TV signals and outputting said received signals; and
   wherein the recorded signals are converted into said received signals and outputted.

3. The recording/reproducing device of claim 1,
   wherein when said conversion means is active converting said received signals to said TV signals, said conversion means is inhibited from converting said TV signals into said received signal.

4. The recording/reproducing device of claim 1, further comprising:
   switch means capable of outputting the received signals before conversion by said conversion means, which is mounted in a display for outputting the received signals, when said conversion means is active.

5. The recording/reproducing device of claim 1,
   wherein a horizontal synchronizing signal period of Video Graphic array signals, an input to said converter, is doubled for conversions from the horizontal synchronizing signal period of NTSC signals.

6. The recording/reproducing device of claim 1, further comprising:
   a disk unit capable of reproducing from a disk,
   wherein said disk unit includes:
     said conversion means; and
     signal switching means for switching outputs of the video signals connected with said conversion means and predetermined RGB signals.

7. The recording/reproducing device of claim 1, wherein said received signals output by said conversion means after converting to an analog signal, are put together to one system.

* * * * *